United States Patent
Heidasch et al.

(10) Patent No.: US 9,311,296 B2
(45) Date of Patent: Apr. 12, 2016

(54) SEMANTIC PHRASE SUGGESTION ENGINE

(71) Applicants: SAP SE, Walldorf (DE); intelligent views gmbh, Darmstadt (DE)

(72) Inventors: Robert Heidasch, Speyer (DE); Stephan Brand, Wiesloch (DE); Archim Heimann, Wiesloch (DE); Nico Licht, Heidelberg (DE); Michael Neumann, Speyer (DE); Stefan Scheidl, Speyer (DE); Steffen Moldaner, Riedstadt (DE); Klaus Reichenberger, Frankfurt (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 0 days.

(21) Appl. No.: 14/610,498

(22) Filed: Jan. 30, 2015

(65) Prior Publication Data
US 2015/0149154 A1  May 28, 2015

Related U.S. Application Data

(63) Continuation of application No. 13/050,333, filed on Mar. 17, 2011, now abandoned.

(51) Int. Cl.
*G06F 17/27* (2006.01)
*G06F 17/28* (2006.01)

(52) U.S. Cl.
CPC ............ *G06F 17/2785* (2013.01); *G06F 17/28* (2013.01); *G06F 17/2881* (2013.01)

(58) Field of Classification Search
CPC ..... G06F 17/27; G06F 17/28; G06F 17/2809; G06F 17/2872; G06F 17/2881; B41B 27/00

USPC ......................................................... 704/1–10
See application file for complete search history.

(56) References Cited

U.S. PATENT DOCUMENTS 4,661,924 A    4/1987 Okamoto et al.
5,995,920 A * 11/1999 Carbonell ............... G06F 17/21
                                                            704/9

(Continued)

FOREIGN PATENT DOCUMENTS

WO           0210980 A1   2/2002
WO     2006124952 A2    11/2006

OTHER PUBLICATIONS

Satoshi Sekine et al., "Acquiring ontological knowledge from query logs," WWW 2007/Track: Data Mining, Jan. 1, 2007, XP055101168, pp. 1223-1224.

(Continued)

*Primary Examiner* — Douglas Godbold
(74) *Attorney, Agent, or Firm* — Kenyon & Kenyon LLP (57) ABSTRACT

A semantic phrase suggestion engine that provides term and sentence suggestions based on context-specific user groups. Knowledge domains within a semantic network may be automatically derived from user software applications, and each term within the knowledge domain includes meta-data about the terms, e.g., term type and an importance indicator. The indicators may be defined within the context of specific user groups and relate to how many times that group has used the term (e.g., in documents, emails, etc.) The semantic phrase suggestion engine may also include spelling conditions and grammar conditions, which can then provide phrase suggestions according to the conditions and importance indicators, specific to a user group.

12 Claims, 4 Drawing Sheets

(56) References Cited

U.S. PATENT DOCUMENTS

| | | | |
|---|---|---|---|
| 6,163,785 A * | 12/2000 | Carbonell | G06F 17/21 704/10 |
| 6,519,586 B2 | 2/2003 | Anick et al. | |
| 6,675,159 B1 | 1/2004 | Lin et al. | |
| 6,996,520 B2 | 2/2006 | Levin | |
| 7,027,974 B1 | 4/2006 | Busch et al. | |
| 7,051,023 B2 | 5/2006 | Kapur et al. | |
| 7,107,264 B2 | 9/2006 | Lu | |
| 7,383,172 B1 | 6/2008 | Jamieson | |
| 7,580,831 B2 | 8/2009 | Haskell et al. | |
| 7,702,647 B2 | 4/2010 | Uceda-Sosa | |
| 7,711,689 B2 | 5/2010 | Kim | |
| 7,774,404 B2 | 8/2010 | Heidasch | |
| 7,865,358 B2 | 1/2011 | Green et al. | |
| 7,870,117 B1 | 1/2011 | Rennison | |
| 7,895,032 B2 * | 2/2011 | Mullen | G06F 17/248 704/257 |
| 7,958,074 B2 | 6/2011 | Uceda-Sosa | |
| 8,156,473 B2 | 4/2012 | Heidasch | |
| 8,180,754 B1 | 5/2012 | Ershov | |
| 8,205,120 B2 | 6/2012 | Heidasch et al. | |
| 8,239,839 B2 | 8/2012 | Rossmann et al. | |
| 8,335,314 B2 | 12/2012 | Heidasch | |
| 8,335,754 B2 | 12/2012 | Dawson et al. | |
| 2003/0130976 A1 | 7/2003 | Au | |
| 2004/0044548 A1 | 3/2004 | Marshall et al. | |
| 2004/0064317 A1 * | 4/2004 | Othmer | G06Q 10/10 704/260 |
| 2005/0080613 A1 | 4/2005 | Colledge et al. | |
| 2006/0085181 A1 | 4/2006 | Komamura et al. | |
| 2006/0143564 A1 | 6/2006 | Bates et al. | |
| 2006/0217964 A1 | 9/2006 | Kamatani et al. | |
| 2007/0016563 A1 | 1/2007 | Omoigui | |
| 2007/0156677 A1 | 7/2007 | Szabo | |
| 2007/0226242 A1 | 9/2007 | Wang et al. | |
| 2007/0255702 A1 | 11/2007 | Orme | |
| 2007/0277164 A1 | 11/2007 | Nandakumaraiah | |
| 2007/0294200 A1 | 12/2007 | Au | |
| 2008/0021698 A1 | 1/2008 | Itoh et al. | |
| 2008/0086465 A1 | 4/2008 | Fontenot et al. | |
| 2008/0097748 A1 | 4/2008 | Haley et al. | |
| 2008/0147646 A1 | 6/2008 | Jaschek et al. | |
| 2008/0167858 A1 | 7/2008 | Christie et al. | |
| 2008/0243480 A1 | 10/2008 | Bartz et al. | |
| 2008/0281810 A1 | 11/2008 | Smyth et al. | |
| 2008/0294982 A1 | 11/2008 | Leung et al. | |
| 2009/0019002 A1 | 1/2009 | Boulis | |
| 2009/0177463 A1 | 7/2009 | Gallagher et al. | |
| 2009/0216696 A1 * | 8/2009 | Downs | G06F 17/30675 706/20 |
| 2009/0292700 A1 | 11/2009 | Castellani et al. | |
| 2010/0063799 A1 | 3/2010 | Jamieson | |
| 2010/0100546 A1 | 4/2010 | Kohler | |
| 2010/0131900 A1 | 5/2010 | Spetalnick | |
| 2010/0268702 A1 | 10/2010 | Wissner et al. | |
| 2010/0286979 A1 | 11/2010 | Zangvil et al. | |
| 2011/0022798 A1 | 1/2011 | Hou et al. | |
| 2011/0077936 A1 * | 3/2011 | Arumugam | G06F 17/218 704/9 |
| 2011/0078205 A1 | 3/2011 | Salkeld et al. | |
| 2011/0213804 A1 | 9/2011 | Lee et al. | |
| 2011/0225139 A1 | 9/2011 | Wang et al. | |
| 2011/0257963 A1 | 10/2011 | Zuev et al. | |
| 2011/0264697 A1 | 10/2011 | Latzina et al. | |
| 2013/0046544 A1 * | 2/2013 | Kay | G06F 3/04883 704/275 |
| 2013/0067430 A1 | 3/2013 | Mayer-Ullmann | |
| 2013/0073546 A1 | 3/2013 | Yan et al. | |
| 2013/0332147 A1 * | 12/2013 | Corfield | G10L 15/065 704/201 |

OTHER PUBLICATIONS

Office Action dated Feb. 21, 2014 issued in corresponding EP Application No. 12003993.8.
European Search Report for EP 12 00 3993, dated Jul. 23, 2012.
European Search Report for EP 12 00 4745, dated Mar. 28, 2013.
Ahu Sieg et al., "Web search personalization with ontological user profiles", Proceedings of the sixteenth ACM Conference on Information and knowledge Management, CIKM '07, Jan. 1, 2007, pp. 525-534, XP050048869.

* cited by examiner

SEMANTIC PHRASE SUGGESTION ENGINE

CROSS-REFERENCE TO RELATED APPLICATION

This application is a Continuation Application of U.S. patent application Ser. No. 13/050,333 filed Mar. 17, 2011, the entire contents of which are incorporated herein by reference.

BACKGROUND

Natural language (or ordinary language) is any language which is the result of the innate facility for language possessed by the human intellect. A natural language is typically used for communication, and may be spoken, signed, or written. For people, the understanding of natural languages reveals much about how language works (e.g., language syntax, semantics, etc.). Electronic databases may store vast amounts of information, which is only useful with an effective search function. Certain technological constructs may be created to translate natural language semantics with stored data relationships in order to provide user search requests with relevant results from the stored data.

A semantic network is a network that represents semantic relations among terms (e.g., concepts). A semantic network may be used as a form of knowledge representation, and therefore may be used to model business knowledge in companies and their various parts, e.g. as enterprise knowledge and/or terminology.

The typical usage may be in search engines, where the network may be used within different techniques to identify the meaning of the term and/or sentence. Mainly the search terms are defined as words in some order or relation. The searched term may then be interpreted by the search engine as a string/term. For example, the search result for "Lotus" may be divided into results about "Lotus" as a model of a car, "Lotus" as a brand of car oil, and "Lotus" as a flower. In this situation, there are different knowledge domains. The knowledge domains can be ordered hierarchically, which allows for knowledge grouping, e.g. the first two meanings may belong to similar knowledge groups, and the last one has nothing in common and is defined in a completely different context/knowledge group (e.g., as a flower).

The natural language distinguishes between different parts of speech and therefore grammarians, e.g., writers of dictionaries, reflect this in the structured terminology catalogues, e.g., dictionaries. One part of the common sentence is the lexical word which is composed of nouns, verbs, and adjectives. Composition of sentences are addressed in the field of linguistics of language syntax; i.e., focus on compositionality in order to explain the relationship between meaningful parts and whole sentences. Therefore, syntax is the study of the principles and rules for constructing sentences in natural language. Further, in language theory, we can see many different "constructs" that try to reflect the language syntax, e.g., define language grammar. An example may include Relational Grammar (RG), e.g., syntactic theory which argues that primitive grammatical relations provide the ideal means to state syntactic rules in universal terms. Another example may include Role and Reference Grammar (RRG), e.g., the description of a sentence in a particular language is formulated in terms of (a) its logical (semantic) structure and communicative functions, and (b) the grammatical procedures that are available in the language for the expression of these meanings. Several other grammatical theories and examples exist, such as: Arc Pain Grammar (APG), Generalized Phrase Structure Grammar (GPSG), Hard-Driven Phrase Structure Grammar (HPSG), and Lexical-Functional Grammar (LFG).

The thematic relation is a term used to express the meaning that a noun (or noun-phrase) plays with respect to the verb, i.e. the action or state described by a sentence's verb. From another perspective, the semantic network is a network which represents semantic relations among terms (concepts). The semantic network is used as a form of knowledge representation and therefore is very often used to model business knowledge in companies and its parts, e.g. as enterprise knowledge/terminology.

The semantic network allows for creation of terms—phrases that are defined by types which characterizes/specifies the particular term (though, a term may be assigned to different types). Additionally, the term may be used in different knowledge areas and may have different (or slightly different) meaning for each area. The knowledge domains may be ordered hierarchically, which allows for knowledge grouping. Therefore, some modeling solutions are used to define context of particular terms/information.

A knowledge domain may group terms that belong to the same subject or expertise area, for example IT, finance, etc. The knowledge/expertise area may be grouped into knowledge domains and may then be used to specify the context of the required information and deliver data with better quality. Typically, the business knowledge and used terminology is distributed through the whole company via the jargon used by company experts and in the many documents associated with the company. The main problem is how to share the currently used business terminology to simplify business communication, e.g. providing phrase/term suggestions in composing documents, like mail, documentations, marketing documents and flyers, etc. Additionally, the same business knowledge (in the form of a business semantic network) may be reused in other business areas, e.g., searching for business information/documents/data.

DETAILED DESCRIPTION

Daily business communication may require, from all participants (business experts and beginners), usage of specific business terminology. A significant amount of terminology may be stored in business applications and in the business semantic network. Example embodiments of the present invention may provide a user-adaptable semantic suggestion engine that allows usage of the terminology in daily business communication.

Example embodiments of the present invention use natural language syntax—defined as language grammar and the semantic network technology—to build a context-specific knowledge-related suggestion engine. Therefore, example embodiments of the solution concentrate on the determining of context-related phrases (terms—defined in a business semantic network), and builds a solution that allows user-specific phrase suggestions (e.g., suggestions oriented to user need/expectations, based on the role of the user).

Figure 1:
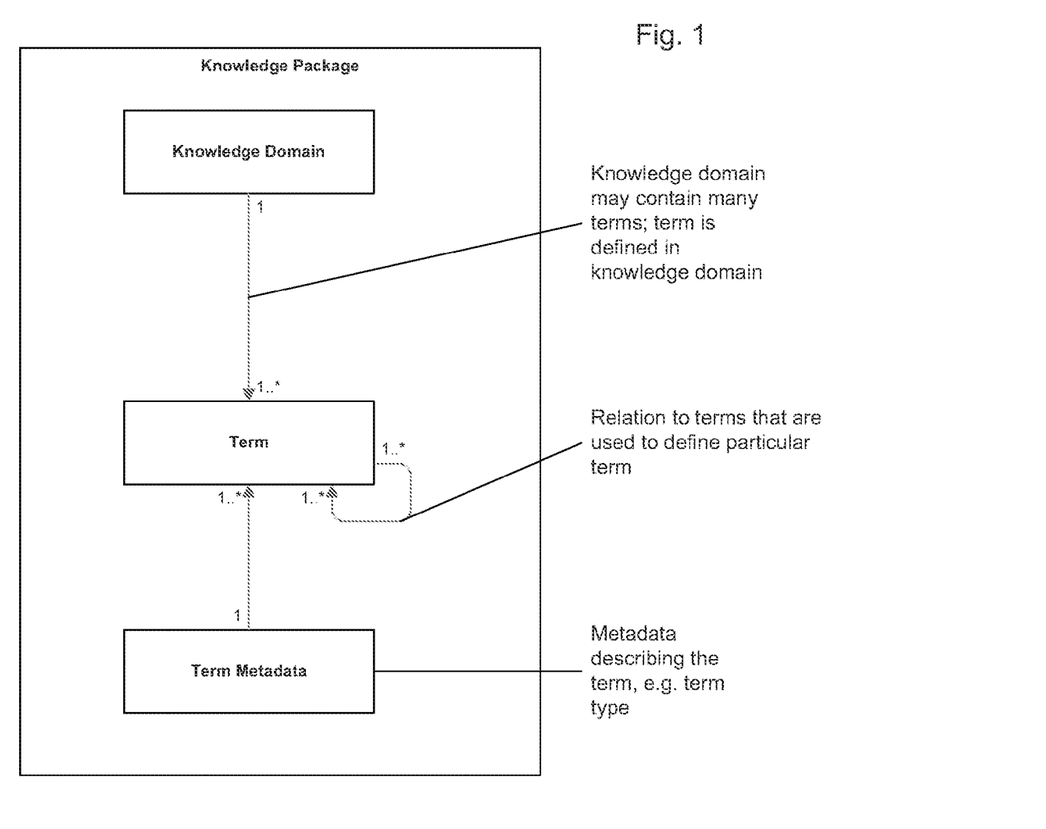
FIG. 1 illustrates an example relational data-structure for terms of a knowledge package, according to one example embodiment of the present invention.

Example embodiments of the present invention may group terminology into knowledge domains, e.g., business-related domains and configure their importance within that domain. This business terminology, stored in business applications, may be exposed via underlying business objects to automatically build the business-oriented semantic network and automatically integrate into the proposed solution. This may include the reuse of structured terminology and its organization-assignment to domains and term types. For example, FIG. 1 illustrates one example embodiment of a knowledge domain of terminology grouped in a related hierarchy and including meta-data. The example embodiments may allow a company to avoid time consuming (e.g., with a high cost of implementation) and very often error prone (e.g., due to many terms, domains, term types) implementations.

Figure 2:
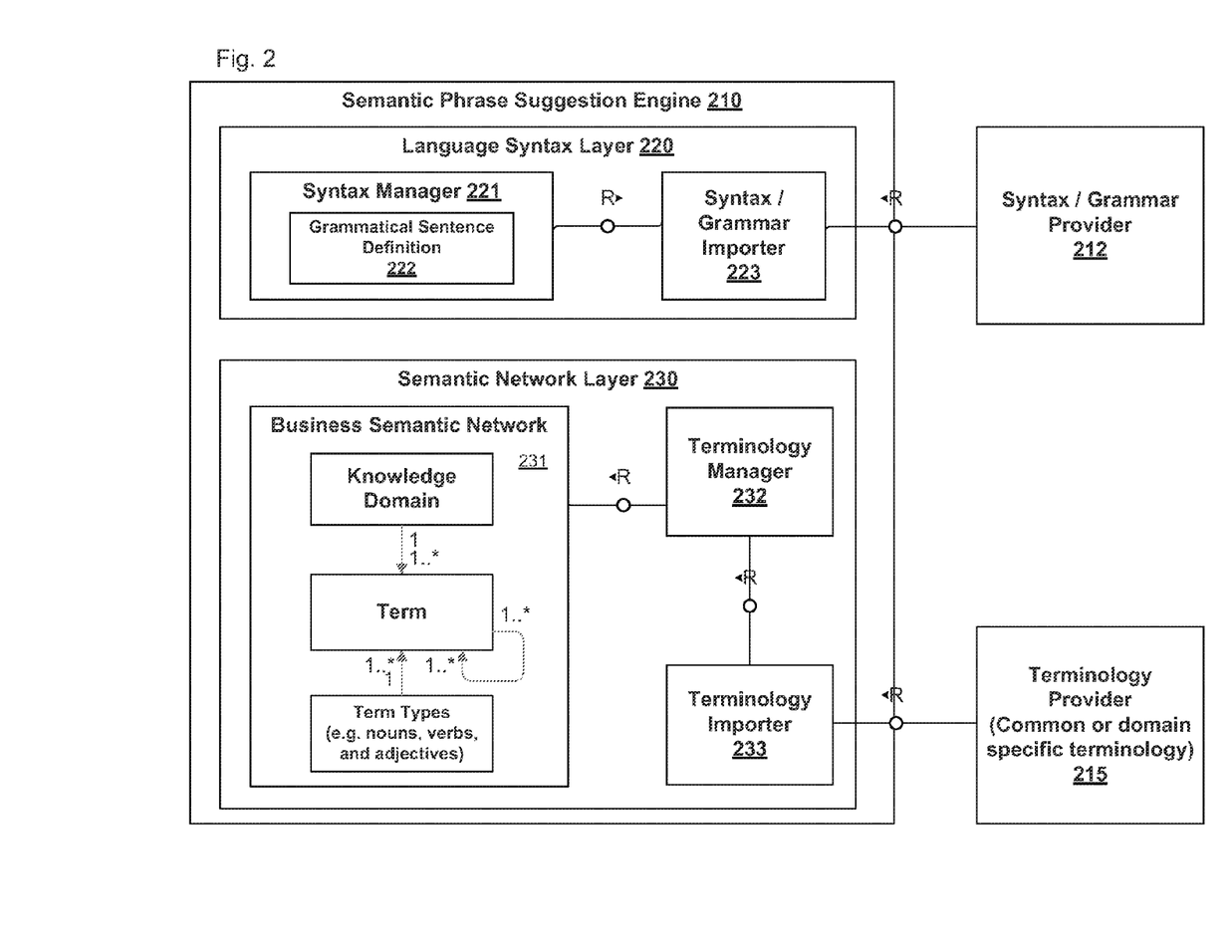
FIG. 2 illustrates an example system including data-structure modules for providing a semantic phrase suggestion engine, according to one example embodiment of the present invention.

FIG. 2 illustrates one example architecture overview of one example suggestion engine solution that supports the phrase/term suggestion functionality using user-specific domain and terminology importance and customer-specific business semantic network. The semantic phrase suggestion engine 210 may include two layers. A first language syntax layer 220 and a second semantic network layer 230. The language syntax layer 220 may be the layer where the syntax (grammar) of the natural language is defined. The semantic network layer 230 may be where the terminology (terms) is defined. The terminology is grouped regarding natural language, knowledge domains.

The definition of syntax (e.g., grammar) of the natural language may be maintained by syntax manager 221—a language dependent manager that manages the access and handling of the particular language-dependent sentence definition 222. This grammatical sentence definition may contain several elements (not shown). Definition 222 may include an ordered sentence definition that may contain phrase/term types (e.g. nouns, verbs, adjectives, etc.). This may ensure that the same term types will be used in a particular semantic network to describe particular terms. Definition 222 may define a sentence importance, e.g., indicator that defines how many times the sentence was used for all users, user-groups and any/each particular user. The initial value may be delivered with the sentence definition by a syntax provider (e.g., 212).

The language syntax layer may use one of several known grammar definitions, e.g. relational grammar (RG), or a new grammar definition. While any definition may be used, example embodiments may ensure that the syntax manager, syntax definition and syntax importer support the same grammar concept/definition, whichever concept/definition is to be used. Therefore, appropriate syntax definition data may need to be imported, which means cross-grammar functionality may not be supported. That is, the grammar definition may be constructed in a method-dependent way. Alternative embodiments may define the grammar in an abstract way (e.g., before the grammar is transferred, translated in a common format, or otherwise used in a specific context).

The semantic network layer 230 consists of several illustrated parts. For example, there may be a business semantic network 231 provided, e.g., a business related and customer-dependent network that contains the used terminology (e.g., common terminology and business-specific terminology). This terminology may be grouped (and transportable) in knowledge domains (domains for short). The semantic network layer 230 may also include a terminology manager 232 that provides access to the business semantic network 230 for end-user request (e.g., terms) and administrative tasks (e.g., terminology maintenance and clean-up). The semantic network layer 230 may also include a terminology importer 233 to import terminology from a terminology provider (e.g., 215). The imported terminology may be required to be compliant with the imported/used grammatical sentence definition, which may mean that both layers (220 and 230) use the same term type definition.

The terms in a business semantic network 231 may be grouped into domains. Further, the terms may be assigned to term types, e.g., a grammar-related definition of type, which may be provided by the grammatical sentence definition (e.g., noun, verb, adjective, etc.). Each term may have an importance indicator that defines how many times the term was used for all users, user-groups, and any/each particular user. The initial value may be delivered with the term definition by a terminology provider (e.g., 215). This indicator may be updated regarding the term usage by the end-user during operation of the engine. Since terminology (e.g., terms) is grouped in domains, they may be imported (transported) into a semantic network. Each user may define the visibility of domains and their respective importance. In this way, the system may automatically suggest the terms that are with highest importance for a particular end-user.

A domain definition may contain several pieces of information. Each domain definition may include a domain identifier (e.g., domain name and domain ID (e.g., a unique key)). Each domain definition may include a terminology hierarchy, e.g., linked terminology. Each domain definition may have an associated importance indicator that defines how important the domain is for an end-user (e.g., user-group and/particular user). This indicator may be updated as the user (e.g., user-groups) use the terms from the particular domain, e.g., during operation of the system.

The business terminology may come from the business application, e.g., business objects defined in software applications. This business terminology, along with the grammar definition may be used to build a sentence context. This means example embodiments may extract the business relevant terms when an end-user is editing a document (e-mail, word, etc.) and may start searching for related information. In this case, the user may not need to enter all of the needed information, as the grammar helps analyzing the content for used business terminology, which may extend the current search terminology and/or be reused in the search terminology. In this situation, it may be easy to provide some contextual search criteria, for example if the end-user entered a sentence including a customer name and a responsible person, the system may automatically offer the option of searching for all sales orders created by the person, etc.

The semantic suggestion engine may support a feature to obtain term suggestions using spelling conditions, e.g., the engine uses the domain, term indicators, and spelling conditions to determine suggested terms. This request may be used typically when the end-user begins entering the sentence and the sentence definitions can not be determined. The semantic suggestion engine may support a feature to obtain term suggestions using the grammar definition, e.g., the engine may use the grammatical sentence definition 222 and using the sentence, domain, term indicators, and spelling conditions, the engine may determine suggested terms. This request may be used when the end-user is typing further sentence elements. The most import sentences (e.g., as determined by the importance indicator) are used to determine the required term type and then the required term (e.g., the assigned type, with highest importance indicator and spelling conditions satisfied).

Figure 3:
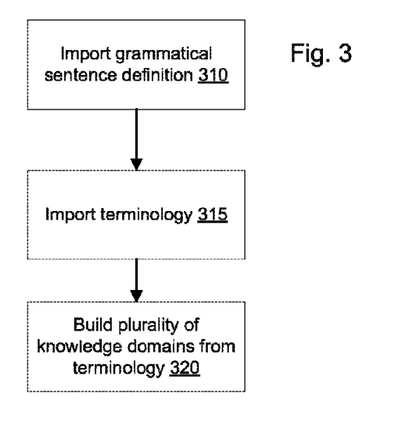
FIG. 3 illustrates an example method for building the knowledge domains, according to one example embodiment of the present invention.

FIG. 3 illustrates an example method for building the knowledge domains. First, at 310, the example method may import a grammatical sentence definition 310. The grammatical sentence definition may define meta-rules for term structures that each knowledge domain may be required to conform to and be consistent with. Next, at 315 the example method may import terminology 315, e.g., from a terminology provider. At 320, the imported terminology may be managed by a terminology manager, and used to build a plurality of knowledge domains. Each knowledge domain may include a hierarchy of related terms, each including meta-data such as term type and/or term importance.

Figure 4:
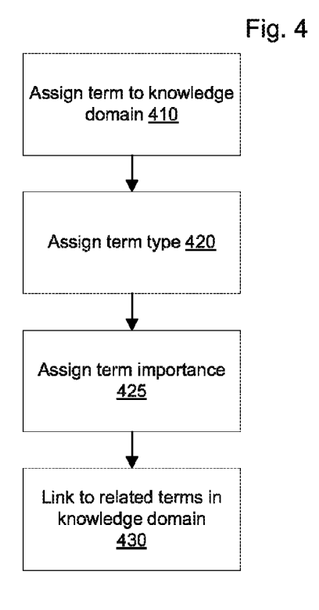
FIG. 4 illustrates one example embodiment of building out a specific knowledge domain and assigning imported terms, according to one example embodiment of the present invention.

FIG. 4 illustrates one example embodiment of building out a specific knowledge domain and assigning imported terms. At 410, an imported term may be assigned to a specific knowledge domain 410, which may be based on the context of the term's origin, the user providing the term, or any number of other pieces of data that define the context of the terms use. At 420, the term may have term type meta-data assign to it (e.g., a verb, noun, adjective, etc.). Other meta-data may also be assigned, such as a term importance indicator at 425. The term importance indicator may be a count of the number of times this term has been used in the domain and/or by a certain set of users. At subsequent uses, the term may be incremented, increasing the term's importance indicator. At 430, further meta-data may be used to describe and link the term to other related terms within the network. links may be weighted, or have various strength descriptors to identify which terms a particular term are most related to, of all the terms the particular term is at least partially related to within the knowledge domain.

Figure 5:
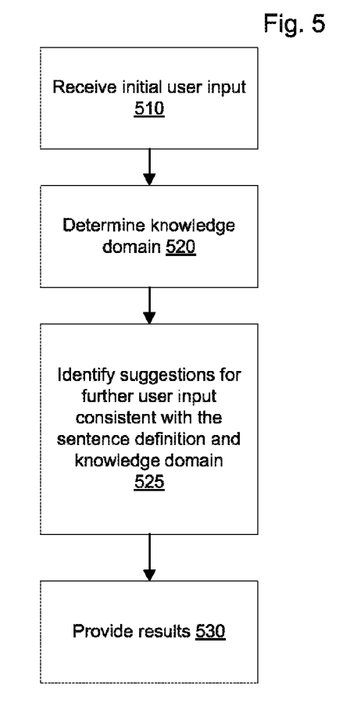
FIG. 5 illustrates an example method of executing the suggestion engine, according to one example embodiment of the present invention.

FIG. 5 illustrates an example method of executing the suggestion engine. The engine may receive initial user input at 510, e.g., the start of a sentence. At 520, a knowledge domain may be identified. The identifying may be based on the user's job-role, the business application currently being used, the initial input from 510, or any combination of these contexts, including other contextual data available to the suggestion engine. Once a knowledge domain is identified, the suggestion engine may provide one or more suggestions for further user input. The suggestions may use related terms from the knowledge domain, along with meta-data like the term importance indicators and the term types (e.g., initial user input may include an adjective type term, and suggestions for a subsequent noun may be based on noun-type terms of high importance and high correlation to the adjective). The suggestions may be constructed to be consistent with the grammatical sentence definition, which may also be used to help structure the suggestions. Those results may be supplied at 530. Supplied results may be used in any number of ways. For example, an application may use resulting suggestions to provide a fly-out menu of suggestions near the user's initial input. Resulting suggestions may take an entire sentence typed by the user as initial input, and identify certain terms that are consistent with other terms in the knowledge domain that have much higher importance indicators. For example, a company email being typed by an HR user to an engineering division may user a certain noun that the suggestion engine identifies as a synonym of another noun that has a much higher importance indicator within the engineering division. The example method may provide an indicator relative to that noun (e.g., a yellow squiggly line under the word indicating suggestions available via a right-click fly-out menu) and suggestions for the more commonly used jargon within the target knowledge domain.

Figure 6:
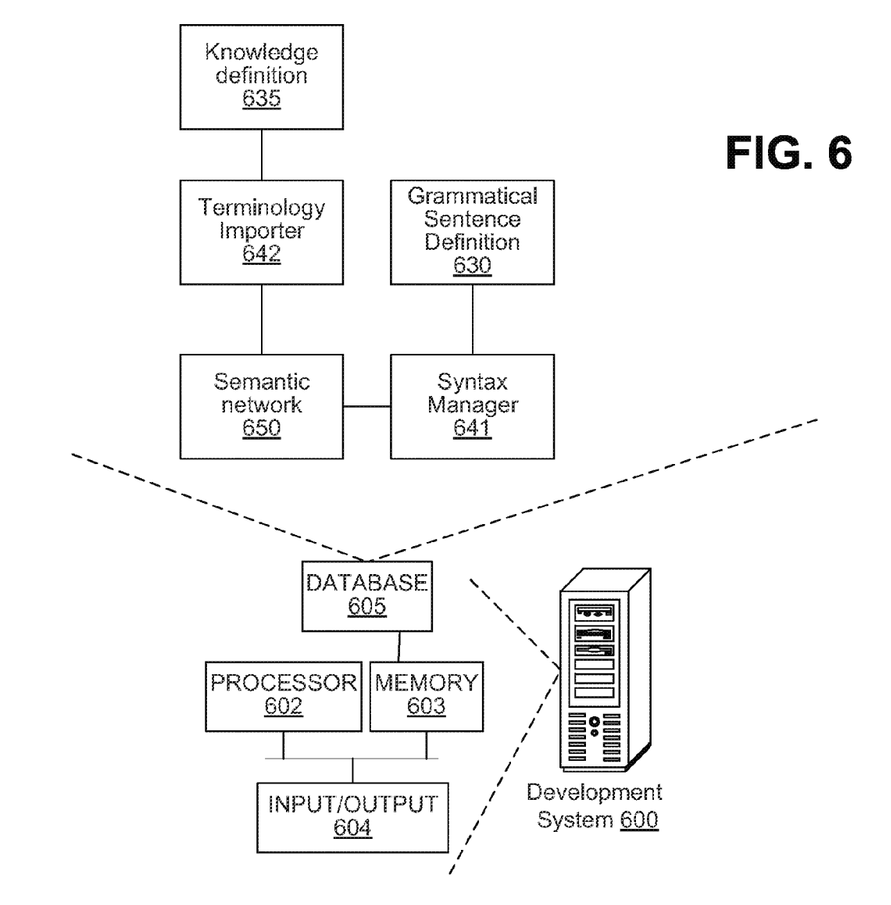
FIG. 6 illustrates an example system, according to one example embodiment of the present invention.

FIG. 6 illustrates one example system for providing the semantic phrase suggestion engine. The example may include one or more server computer systems, e.g., development system 600. This may be one server, a set of local servers, or a set of geographically diverse servers. Each server may include an electronic computer processor 602, one or more sets of memory 603, including database repositories 605, and various input and output devices 604. These too may be local or distributed to several computers and/or locations. Database 605 may include data comprising the various software components of the other example embodiments of the present invention.

For example, the database may include the syntax manager 641 with the grammatical sentence definition 630. The database may also include the semantic network 650 including the terminology importer 642 and knowledge definitions/domains 635. These entities may be stored in database 605, or may be distributed across other systems, independently or connected via a communication network.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable storage medium, e.g., memory 603, with instructions to cause a processor, e.g., processor 602, to execute a set of steps according to one or more example embodiments of the present invention.

The semantic suggestion engine could likewise be installed on any number of devices, such as local machines (PC, laptop), which would therefore provide the integration/central infrastructure to collect importance of sentences, domains, and terms. This may be used to setup new engines, e.g. initial setup for next user-installations.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the invention and its various aspects, as may be readily apparent to those of ordinary skill in the art, and that the invention is not limited by specific embodiments described herein. Features and embodiments described above may be combined. It is therefore contemplated to cover any and all modifications, variations, combinations or equivalents that fall within the scope of the basic underlying principals disclosed and claimed herein.

The invention claimed is:

1. A semantic phrase engine, comprising:
   an electronic processor in communication with an electronic storage medium configured to provide:
   a language syntax layer including a syntax manager with a grammatical sentence definition that defines a particular rule structure that applies to all sentences used in the semantic phrase engine and includes term types, wherein the grammatical sentence definition also includes a sentence importance indicator;
   a semantic network layer including:
      a plurality of knowledge domains each defining a hierarchy of terms related by a common business context, wherein each term has an assigned type specified in the grammatical sentence definition and wherein each term has a user-specific term importance indicator that includes term importance information for a combination of all users, user groups, and a particular user;
      a terminology manager to provide end-user requests for terms and administrative tasks for terms;
      a terminology importer to receive terms into a knowledge domain and ensure the terms are compliant with the grammatical sentence definition,
      wherein the relative importance of one or more knowledge domains is defined by a combination of the particular user and the particular user's associated user groups; and
   a suggestion module configured to analyze initial user input and provide suggestions for remaining input that are consistent with the grammatical sentence definition and from a determined knowledge domain,
   wherein the initial user input comes from a user who is associated with a group of users from a plurality of groups, and wherein each of the terms includes an importance indicator defined for a specific group of users, and
   wherein calculation of a greater importance indicator generates an importance indicator associated with each suggestion that is associated with the group of users and indicates importance greater than the importance indicator associated with the respective term and associated with the group of users.

2. The semantic phrase engine of claim 1, wherein the sentence importance indicator defines how many times a particular sentence is used for a particular set of users.

3. The semantic phrase engine of claim 1, wherein the user-specific term importance indicator defines how many times each term was used by a particular set of users.

4. The semantic phrase engine of claim 1, wherein administrative tasks for terms includes tools for adding terms, approving added terms, deleting terms, modifying the user-specific term importance indicator, and modifying the hierarchy.

5. The semantic phrase engine of claim 1, wherein providing suggestions for remaining input includes ranking a plurality of suggestions according to associated importance indicators.

6. A method of providing semantic phrase suggestions, comprising:
   receiving initial user input including a plurality of terms, the initial user input coming from a user who is associated with a group of users from a plurality of groups, and wherein each of the plurality of terms includes an importance indicator defined for a specific group of users;
   for each respective term: identifying, with an electronic processor, an associated term type if the respective term is defined in the semantic network;
   identifying, with the electronic processor, alternative terms related to the respective term and having a same term type and a calculated user-specific importance indicator that is greater than its related respective term; and
   if the respective term is not defined in the semantic network, providing alternative spelling suggestions based on the initial user input and spelling conditions,
   wherein user-specific importance indicator includes term importance information for a combination of all users, user groups, and a particular user, and includes the relative importance of one or more knowledge domains defined by a combination of the particular user and the particular user's associated user groups, and
   wherein calculation of a greater importance indicator generates an importance indicator associated with each alternative term that is associated with the group of users and indicates importance greater than the importance indicator associated with the respective term and associated with the group of users.

7. The method of claim 6, wherein each user-specific importance indicator defines how many times a respective term was used by a particular set of users.

8. A computer-implemented method of providing semantic phrase suggestions, comprising:
   receiving initial user input including a plurality of terms, the initial user input coming from a user who is associated with a group of users from a plurality of groups, and wherein each of the plurality of terms includes an importance indicator defined for a specific group of users;
   identifying a term type associated with each term of the initial user input;
   comparing the term types with a pre-defined semantic grammar definition;
   identifying, based on the comparing, term types compatible with the initial user input;
   identifying suggestion terms to augment the initial user input based on grammar compatibility and user-specific importance indicators; and
   suggesting the suggestion terms,
   wherein user-specific importance indicator includes term importance information for a combination of all users, user groups, and a particular user, and includes the relative importance of one or more knowledge domains defined by a combination of the particular user and the particular user's associated user groups, and
   wherein calculation of a greater importance indicator generates an importance indicator associated with each alternative term that is associated with the group of users and indicates importance greater than the importance indicator associated with the respective term and associated with the group of users.

9. The method of claim 8, wherein importance indicators are determined based on a number of times an associated term is used within a particular knowledge domain.

10. The method of claim 8, wherein responsive to the comparing indicating initial user input is incompatible with the pre-defined semantic grammar definition, identifying and suggesting alternative spelling conditions for terms of the initial user input.

11. The method of claim 8, wherein the suggesting organizes the suggestion terms according to associated importance indicators.

12. The method of claim 8, wherein the identifying suggestion terms based on importance indicators includes a cut-off value for the importance indicator, such that only terms having an associated importance indicator value greater than the cut-off value are identified as suggestion terms.

\* \* \* \* \*